US006446952B1

(12) United States Patent
Sheehy, Jr.

(10) Patent No.: US 6,446,952 B1
(45) Date of Patent: Sep. 10, 2002

(54) CLIP SYSTEM FOR HOLDING VISE PARALLELS

(75) Inventor: James J. Sheehy, Jr., Bensalem, PA (US)

(73) Assignee: Precision Products Co., Inc., Warminster, PA (US)

( * ) Notice: Subject to any disclaimer, the term of this patent is extended or adjusted under 35 U.S.C. 154(b) by 80 days.

(21) Appl. No.: 09/690,248

(22) Filed: Oct. 17, 2000

Related U.S. Application Data

(63) Continuation-in-part of application No. 09/432,514, filed on Nov. 2, 1999, now Pat. No. 6,155,550.

(51) Int. Cl.$^{7}$ .................................................. B23Q 3/06

(52) U.S. Cl. ........................ 269/277; 269/296; 269/271

(58) Field of Search ................................ 269/277, 275, 269/279, 264, 296, 271

(56) References Cited

U.S. PATENT DOCUMENTS 4,558,856 A * 12/1985 Shaffer ........................ 269/277
5,222,997 A * 6/1993 Montgomery ............... 269/277
6,024,353 A * 2/2000 Christeson .................. 269/277

* cited by examiner

*Primary Examiner*—Robert C. Watson
(74) *Attorney, Agent, or Firm*—Armand M. Vozzo, Jr.

(57) ABSTRACT

An improved clip system is disclosed for holding parallels in place against the respective jaws of a vise head. The clip system comprises a pair of specially configured clip members adapted to releasably engage a notched slot formed along the side edges of the jaw on the rearward surface thereof, each slot being accessible for engagement through corresponding opening formed in the forward comers of the vise head. Each clip member is integrally formed having a hook section inwardly disposed at an intermediate position along its length to engage the notched slot in a forwardly direction and a cap section inwardly disposed at the forward end of the clip member to clamp flush against the parallel and hold it firmly against the jaw when the hook section is engaged with the notched slot. The clip members are further formed each having an outwardly disposed leg section intended to deflect in a forward direction thereby releasing the clip member from engagement with the notched slot and allowing removal of the parallel. In an alternate embodiment of the system, the notched slot is provided in a recessed cavity formed on either side of the back of the jaw allowing engagement by the clip members and their respective hook sections without need for openings in the forward corner of the vise head.

11 Claims, 8 Drawing Sheets

CLIP SYSTEM FOR HOLDING VISE PARALLELS

CROSS-REFERENCE TO RELATED APPLICATION

This application is a continuation-in-part of application Ser. No. 09/432,514 filed Nov. 2, 1999 now U.S. Pat. No. 6,155,550 for Clip System for Holding Vise Parallels.

BACKGROUND OF THE INVENTION

The present invention relates to the positioning of a workpiece in a vise for machining, and more particularly to an improved clip system for holding parallel plates against respective jaws of the vise in proper position to mount the workpiece during machining.

A vise is commonly used to secure a workpiece intended to be machined. Typically, the workpiece is mounted within the opposite jaws of the vise and secured in proper position therebetween using a pair of flat, metal plates known as parallels. These parallels, which may be of varying widths and thicknesses, are mounted immediately adjacent to the respective jaws in substantially identical positions on either side of the vise so that their upper margins act as reference surfaces for the mounting of the workpiece between the vise jaws. The parallels thus serve to mount the workpiece in an exact attitude while machining and it is essential that the parallels be held securely in place against the jaws in order for the workpiece to be machined correctly.

In the past, a number of different devices have been used to hold the parallels against the jaw surfaces. For instance, spring members have been inserted in the space between the parallels in pressing engagement with the parallels themselves with the springs being under compression. While these spring members have effectively served to position the parallels pressed against the vise jaws they can become easily dislodged under working conditions and hurdle through space, risking bodily injury to a workman adjacent to the workpiece. Other, more elaborate systems have been used but these have been expensive to produce and complex to use, and they require considerable amount of space for use in holding the parallels in place. Some of these more elaborate prior art holding systems have required substantial modifications to the standard jaws of a machine vise in order to implement their use and operation, and in many cases, the costs and effort to adapt those holding systems to existing vises has been burdensome. Furthermore, most of these existing systems have been devised and developed for disposition and operation within the spatial confines between the opposed vise jaws. As a result, these existing holding systems may sometimes interfere with the positioning of the workpiece between the jaws and disrupt its proper attitude for machining. A need therefore exists for an improved parallel holding system that works safely and effectively without interfering with the position of the workpiece while machining, and that can easily adapt to existing machine vises.

SUMMARY OF THE INVENTION

Accordingly, it is a general purpose and object of the present invention to provide an improved system for holding parallels properly in place against the jaws of a vise.

Another object of the present invention is to provide an improved parallel holding system that is safer and easier to use on existing machine vises without interfering with a workpiece while it is being machined.

Still another object of the present invention is to provide a parallel holding system that is easily adapted to existing vises and that is effective in holding parallels of various sizes in proper position against the vise jaws.

A still further object of the present invention is to provide a parallel holding system that is easy to manipulate and reasonably inexpensive to manufacture and implement.

Briefly, these and other objects of the present invention are accomplished by an improved clip system for holding parallels in place against the respective jaws of a vise head. In one embodiment, the system comprises a pair of specially configured clip members adapted to releasably engage a retaining plate mounted flush between the jaw and the vise, the retaining plate being formed having a slotted tab extended from either side of the plate for engaging a respective one of the clip members. Each clip member is integrally formed having a hook section inwardly disposed at an intermediate position along its length to engage the slotted tab in a forwardly direction and a cap section inwardly disposed at the forward end of the clip member to clamp flush against the parallel and hold it firmly against the jaw when the hook section is engaged with the slotted tab. The clip members are further formed each having an outwardly disposed leg section intended to deflect in a forward direction thereby releasing the clip member from engagement with the retaining plate and allowing removal of the parallel. In a modified embodiment of the system, no retainer plate is employed but instead a notched slot is formed along both side edges of the jaw on the rearward surface thereof and the clip members are adapted so that their respective hook sections are engaged with the slots on either side of the jaw through corresponding openings formed in the forward comers of the vise head to provide clamping of the parallel against the front of the jaw. In a similar system embodiment, the notched slot is provided in a recessed section formed on either side of the back of the jaw allowing engagement by the clip members and their respective hook sections without need for openings in the forward comers of the vise head.

For a better understanding of these and other aspects of the present invention, reference should be made to the following detailed description taken in conjunction with the accompanying drawings in which like reference numerals and characters designate like parts throughout the figures thereof.

BRIEF DESCRIPTION OF THE DRAWINGS

For a fuller understanding of the nature and objects of the present invention, references in the detailed description of the preferred embodiment set forth below shall be made to the accompanying drawings in which.

For a better understanding of these and other aspects of the present invention, reference should be made to the following detailed description taken in conjunction with the accompanying drawings.

DESCRIPTION OF THE PREFERRED EMBODIMENT

Figure 1:
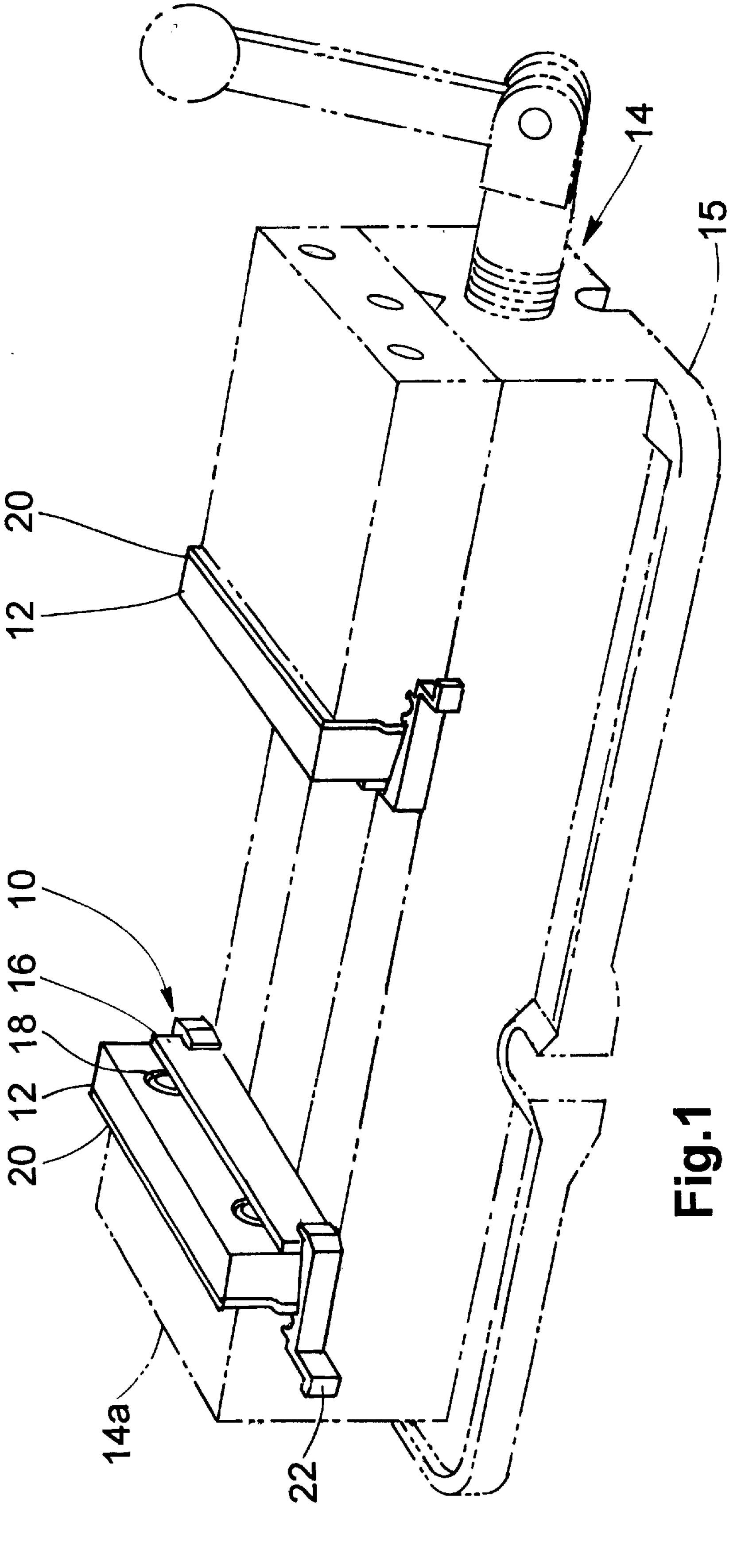
FIG. 1 is a top perspective view of standard machine vise shown in phantom outline and equipped with a clip system for holding parallels in place along the respective jaw of the vise in accordance with the present invention.

Referring now to the drawings and particularly at first to FIG. 1, an improved clip system, generally designated 10, is shown in operating position assembled to the respective jaws 12 of a standard machine vise 14 to retain separate parallels 16 along the opposed surfaces of the jaws. The vise 14, shown in phantom outline, is a conventional tool commonly used to hold a workpiece (not shown) in machines such as drill presses, milling machines and the like having a stationary head 14*a* and a movable head 14*b* supported on a base 15. Each of the jaws 12 are attached firmly to the body of the vise 14 and removable from the respective heads 14*a* and 14*b* by mean of machine bolts 18 or the like secured through circular openings in the jaw, each opening being respectively aligned with threaded holes formed in the respective heads of the vise. The parallels 16 intended to be held in place by the present clip system 10 are the conventional type of flat, metal plates typically set against the respective jaws 12 on opposite heads 14*a,* 14*b* of the vise 14 to mount the workpiece in an exact location or attitude during machining.

Figure 2:
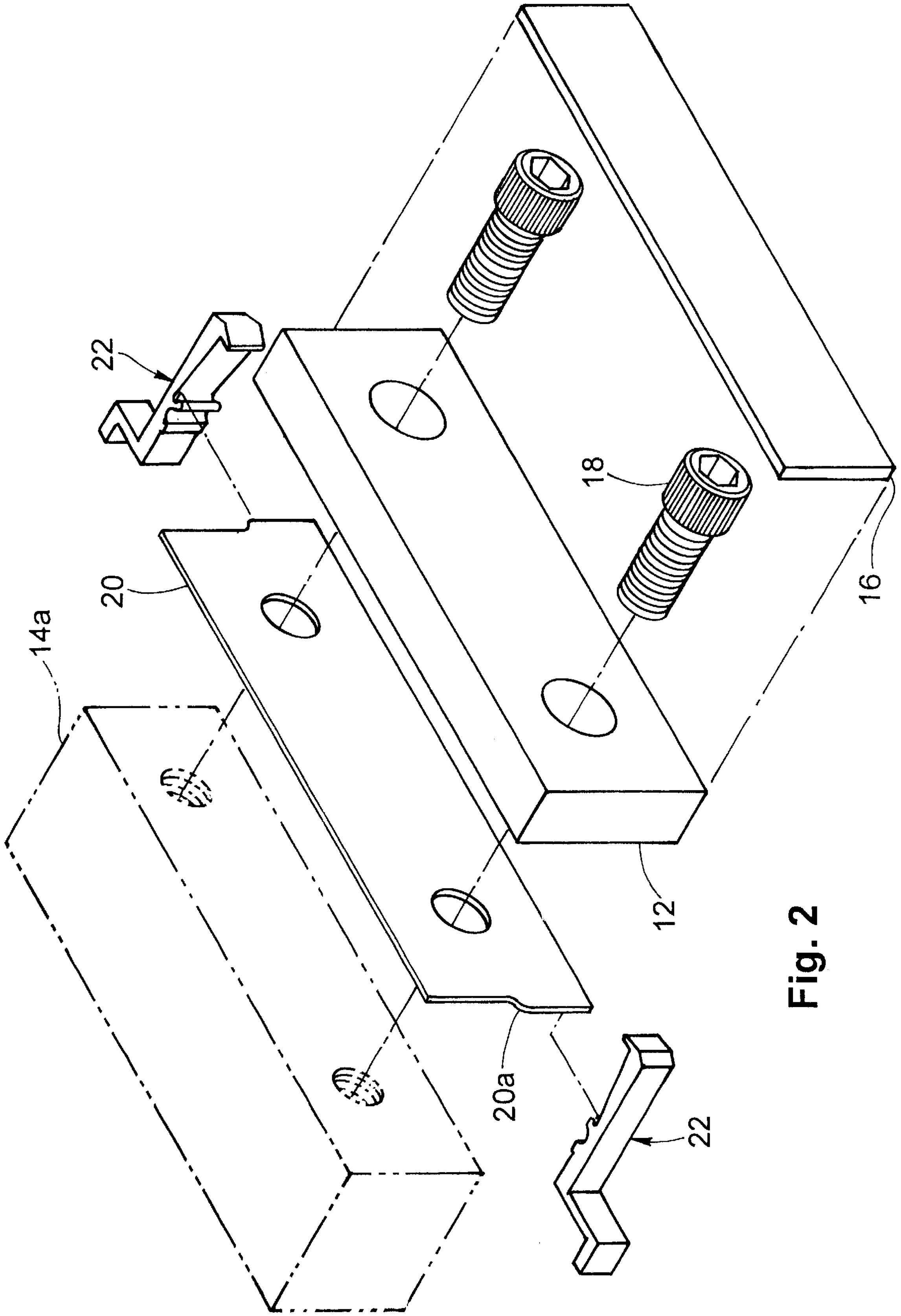
FIG. 2 is an exploded view in perspective of the present clip system shown in association with one of the respective vise jaws viewed in FIG. 1.
Figure 8:
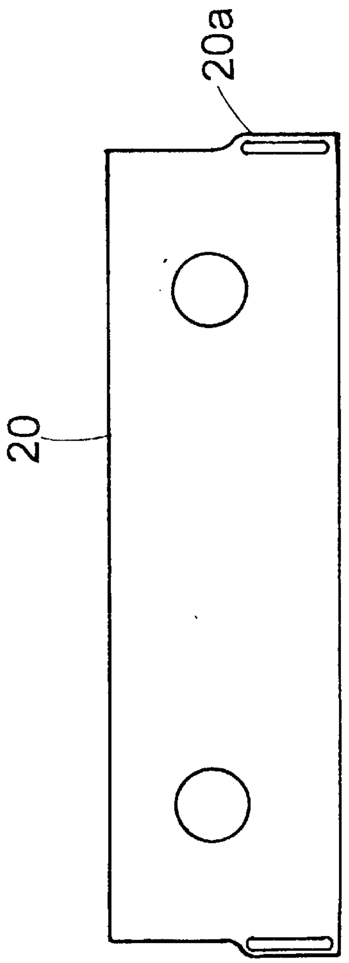
FIG. 8 is a forward elevation view taken along the line 8—8 of FIG. 4 illustrating the retaining plate used in accordance with the present invention.
Figure 7:
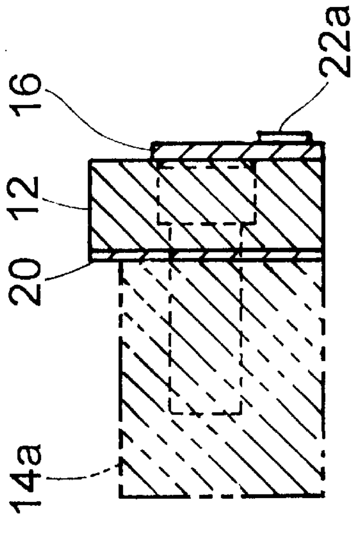
FIG. 7 is a cross-sectional view of the assembled clip system taken along the line 7—7 of FIG. 4.

Referring now to FIG. 2 in conjunction with FIG. 1, the clip system 10 includes a retaining plate 20 intended to mount flush between jaw 12 and either of the vise heads, the stationary head 14*a* being shown in FIG. 2 and throughout the remaining drawing figures. The retaining plate 20 is a substantially flat metal plate preferably made of a high grade of tool steel. As best viewed in FIG. 8, the retaining plate 20 is fabricated having essentially the same rectangular profile as the jaw 12 but further formed having a slotted tab 20*a,* described in greater detail below, extending transversely from either side of the plate. Each retaining plate 20 is further fabricated having circular openings through the thickness of the plate intended to align with those formed in jaw 12 and vise head 14*a* so that machine bolts 18 may threadingly engage the vise head and secure the retaining plate firmly between the vise head and the jaw. It is noted and should be understood that the retaining plate 20 is mounted in the aforedescribed manner having the slotted tab 20*a* facing toward the vise head 14*a* and away from the jaw in order to serve the operation of the clip system 10 in accordance with the present invention.

Figure 5:
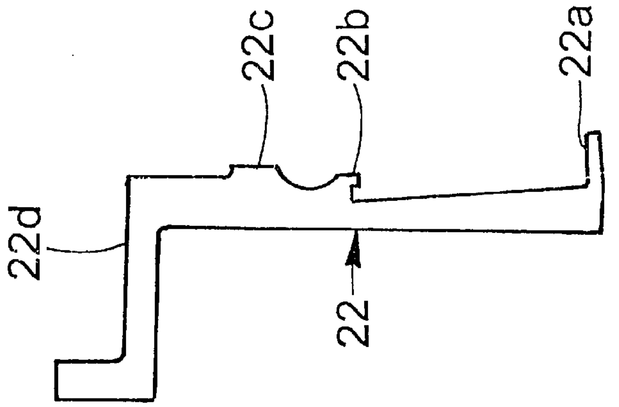
FIG. 5 is a detailed plan view of the clip member used in accordance with the present invention.
Figure 3:
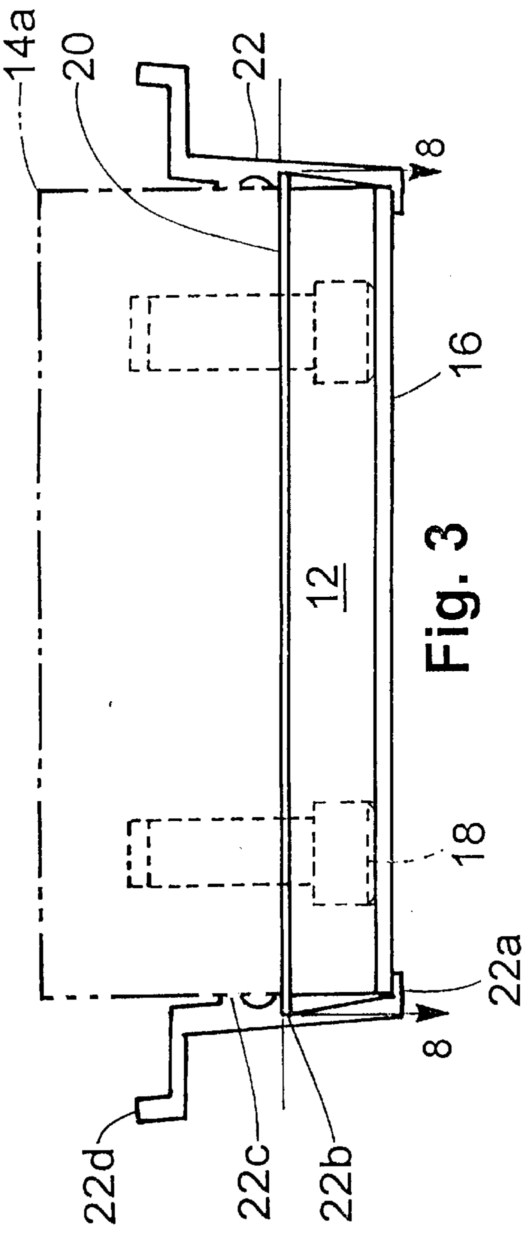
FIG. 3 is a top plan view of the present clip system assembled in place upon the vise jaw of FIG. 2.
Figure 4:
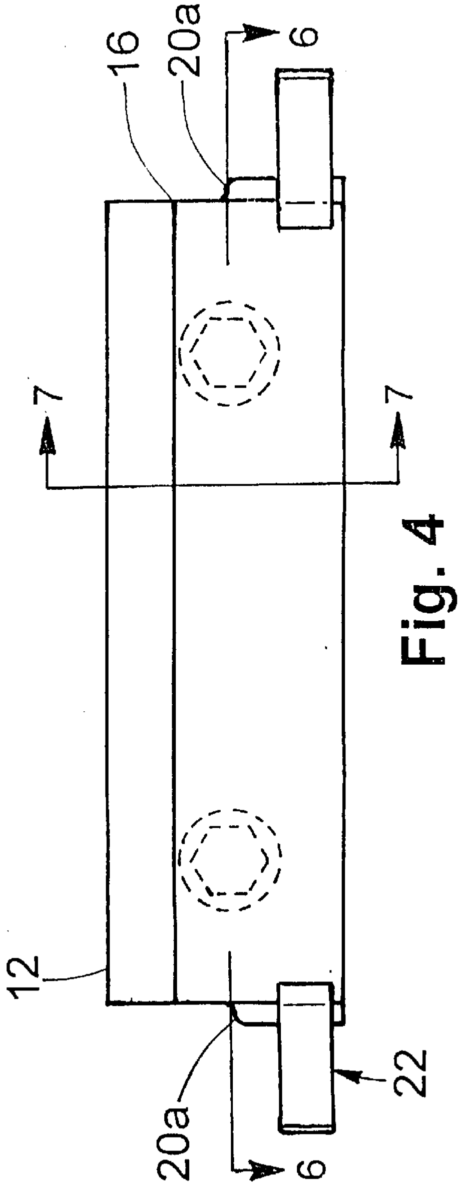
FIG. 4 is a front elevation view of the assembled clip system illustration in FIG. 3.
Figure 6:
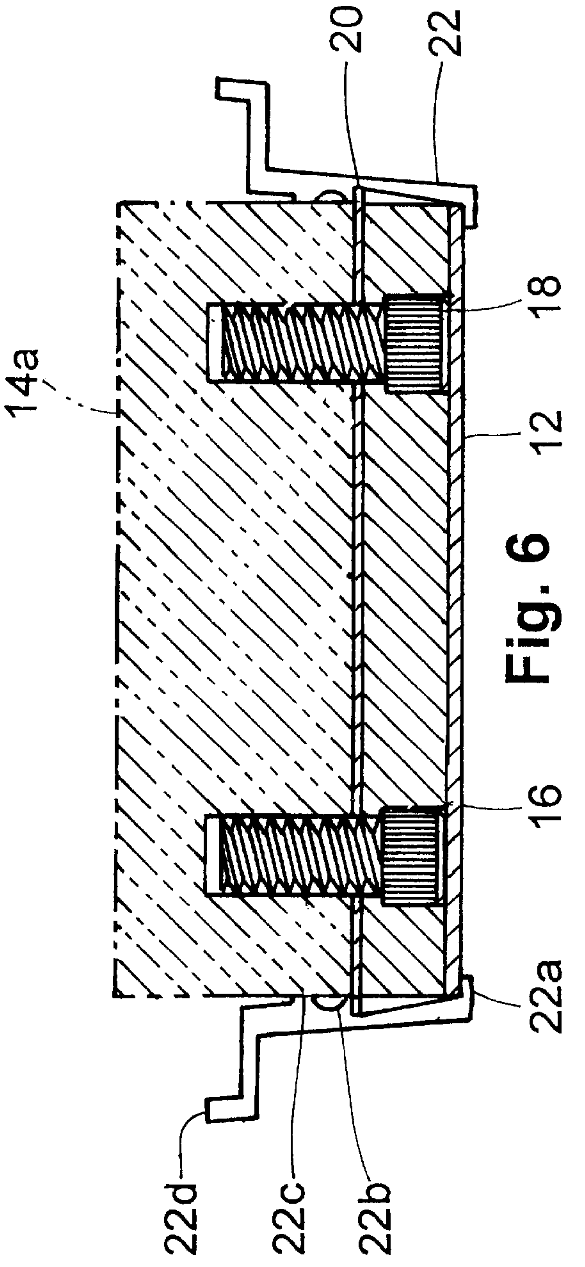
FIG. 6 is a cross-sectional view of the assembled clip system taken along the line 6—6 of FIG. 4.

Referring now to FIGS. 3–7 in conjunction with FIGS. 1 and 2, the clip system 10 further includes a pair of clip members 22 specially configured to engage the slotted tab 20*a* on either side of the retaining plate 20, thereby clamping the parallel 16 against the face of jaw 12 when assembled to the jaw with the retaining plate mounted between the jaw and vise head 14*a.* In this assembled state, best viewed in FIGS. 3 and 6, the clip member 22, having a substantially L-shaped cross section, is disposed alongside the assembled jaw 12, retaining plate 20 and vise head 14*a* to clamp respective edges of parallel 16 in place on either side of the jaw when engaged, as described below, with the slotted tab 20*a* of the retaining plate.

Referring particularly now to FIG. 5, clip member 22 is substantially rigid in its form yet bendable along its length between a forward cap section 22*a* and a rearward leg section 22*d.* The clip member 22 is preferably fabricated, typically by molding, of a plastic material, such as nylon, to provide strength to the clip member for clamping as well as flexibility for its spring-like engagement of the retaining plate 20. As best seen in the profile of FIG. 5, each clip member 22 is integrally formed having cap section 22*a* and leg section 22*d* projecting in opposite directions substantially perpendicular to the main body of the clip member at the forward and rearward end thereof, respectively. Cap section 22*a* is a relatively thin pad-like appendage at the forward end of the clip member 22 intended to fit flush to the front edge of parallel 16 and clamp it against jaw 12. Leg section 22*d* is a relatively thicker appendage projecting from the rearward end of the clip member 22 opposite from the cap section 22*a.* Intermediate of the cap section 22*a* and leg section 22*d,* a hook section 22*b* is formed on the clip member 22 projecting from the main body in the same direction as the cap section 22*a.* The hook section 22*b* is formed along the main body of clip member 22 a distance rearward and spaced apart from the cap section 22*a* that is substantially equal to the aggregate thickness of the assembled parallel 16, jaw 12 and retaining plate 20. This spacing of the hook section 22*b* apart from the cap section 22*a* allows these sections to cooperate in clamping the parallel 16 to the forward face of jaw 12 when the hook section is engaged in the slotted tab 20*a.* A flattened section 22*c* raised in the main body of clip member 22 between the hook section 22*b* and leg section 22*d* provides a reference surface for contact of the clip member with the side of vise head 14*a* and sets the position of the hook section 22*c* for proper engagement with the slotted tab 20*a* of the retaining plate 20.

To implement and operate the present clip system 10, therefore, the retaining plate 20 is initially secured and mounted in place between the jaw 12 and vise heads 14*a,* 14*b* on opposite sides of vise 14. When the selected parallels 16 are ready to be secured to the forward surface of the respective jaws 12, clip member 22 is placed alongside of the respective vise head 14*a,* 14*b* assembled together with the jaw and retaining plate 20 with the cap section 22*a* of the clip member being directed to the forward surface of the jaw to cover the edge of the parallel thereon. With the parallel 16 in place against jaw 12 and its edge inserted beneath the inwardly disposed cap section 22*a,* the clip member 22 is urged into engagement with retaining plate 20 alongside the respective vise head 14*a,* 14*b* with the hook section 22*b* fitting into and engaging the slotted tab 20*a* in a forwardly direction and the flattened section 22*c* flush against the vise head. The cap section 22*a* is thereby urged rearward against the edge of parallel 16 clamping the parallel flush against the jaw 12 and holding it firmly in place until the clip member 22 is released. To release the clip member 22 and remove the associated parallel 16 from jaw 12, the leg section 22*d* is deflected in a forward direction thereby withdrawing the hook section 22*b* from the slotted tab 20*a* and releasing the cap section 22*a* from the parallel.

Figure 9:
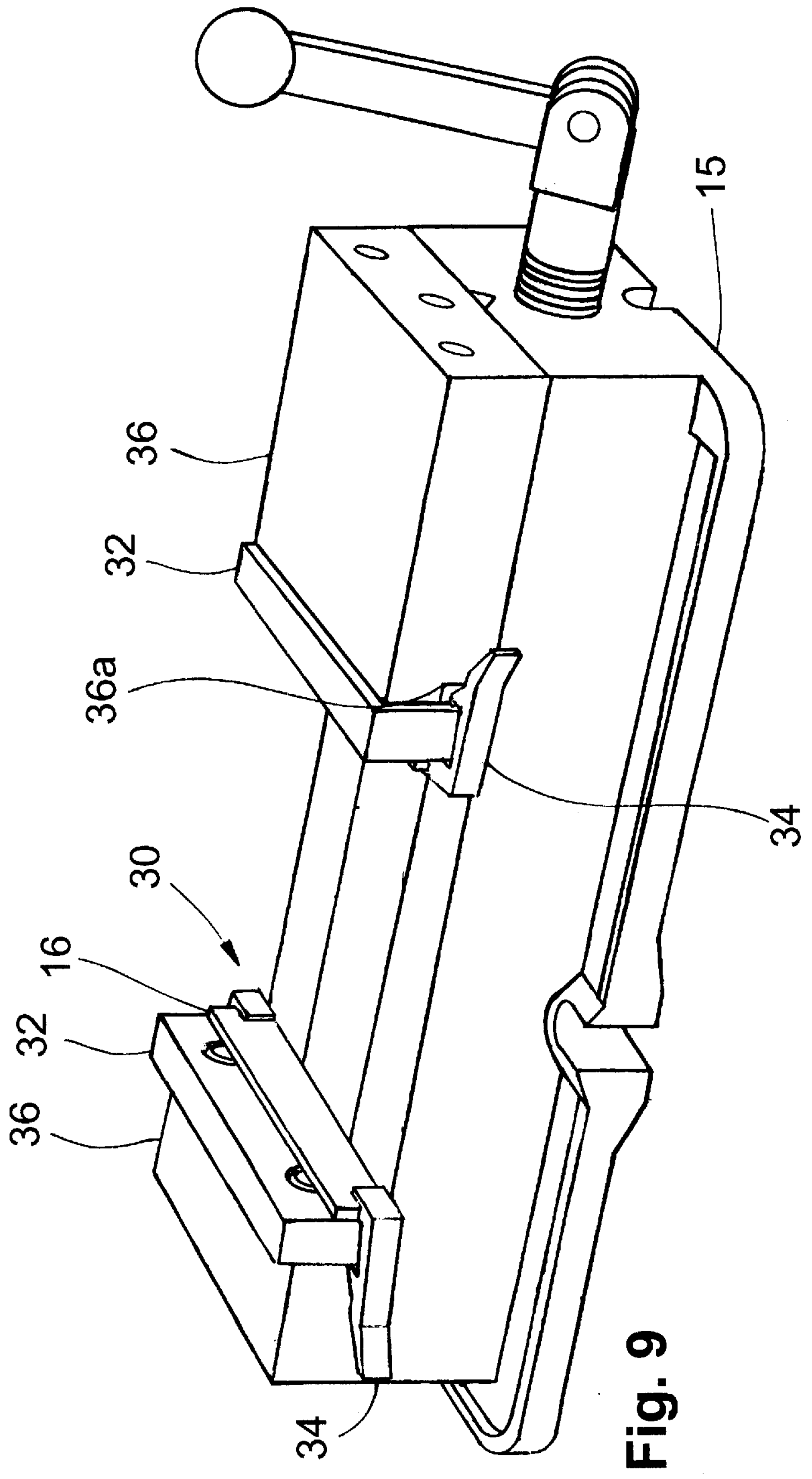
FIG. 9 is a top perspective view of a modified embodiment of the clip system assembled upon a machine vise for holding vise parallels in place.
Figure 10:
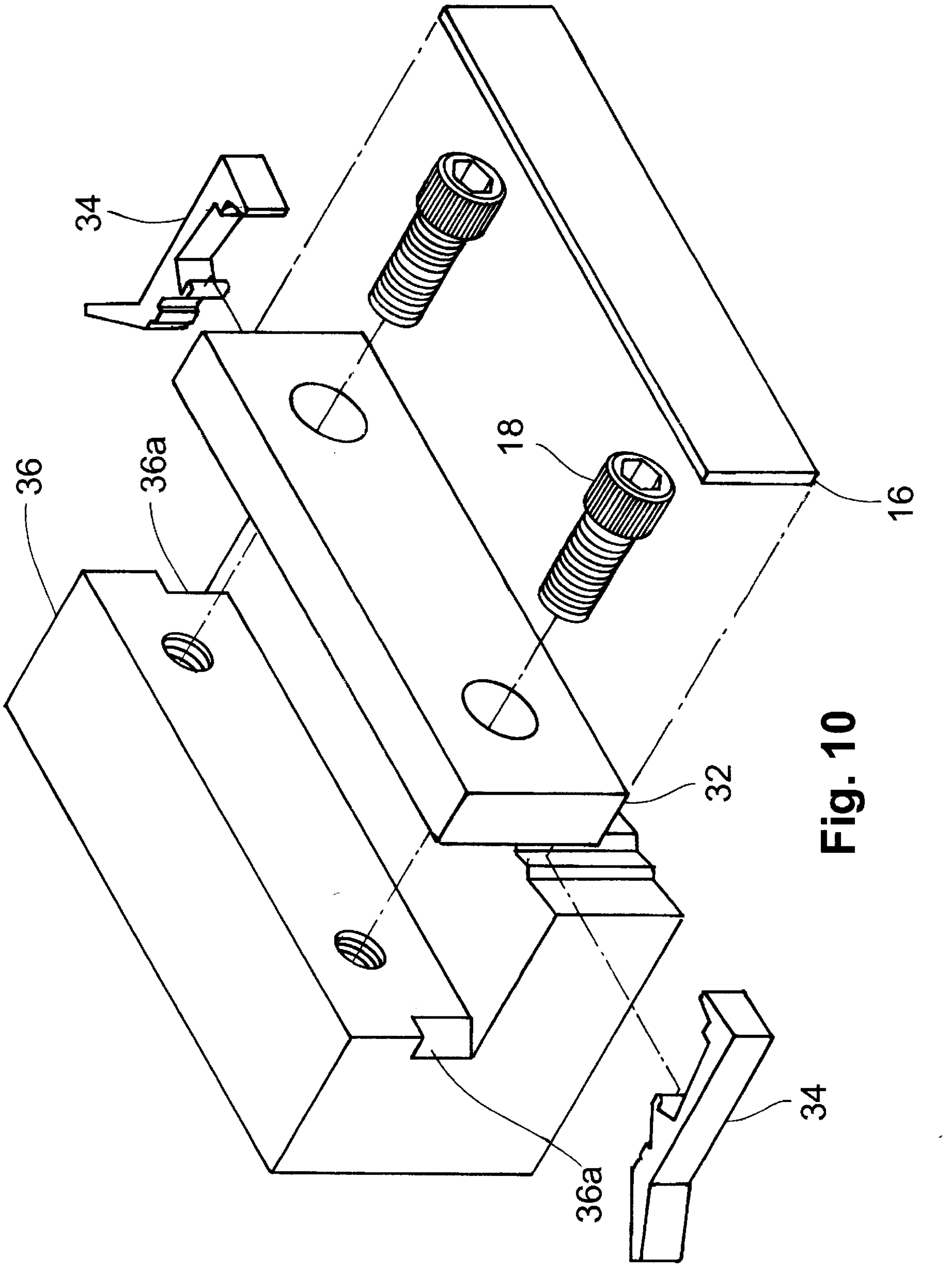
FIG. 10 is an exploded view in perspective of the modified clip system shown in FIG. 9.
Figure 13:
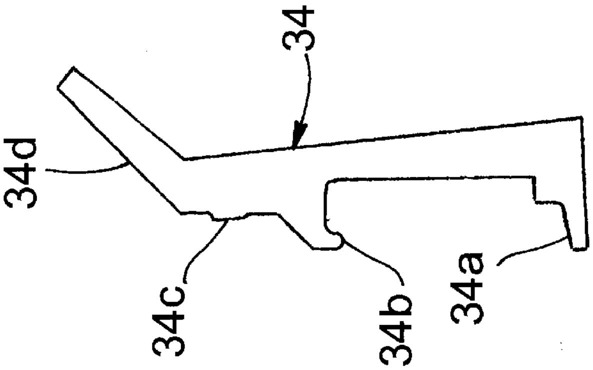
FIG. 13 is a detailed plan view of the clip member used in the modified clip system of FIG. 9.
Figure 12:
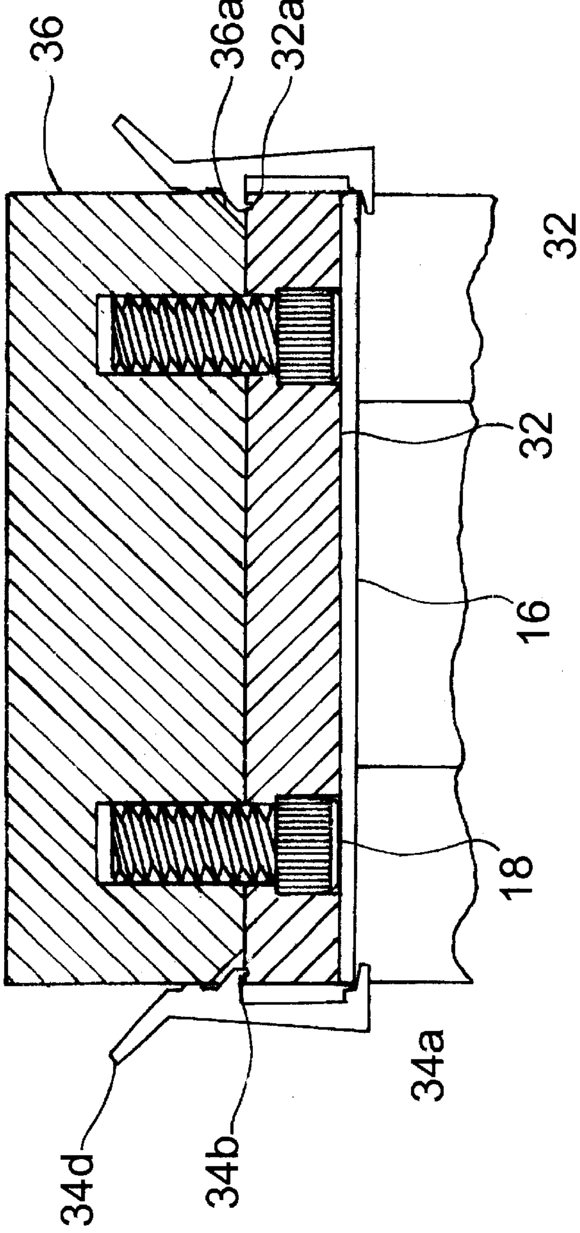
FIG. 12 is a cross-sectional view of the assembled clip system taken along the line 12—12 of FIG. 11.
Figure 11:
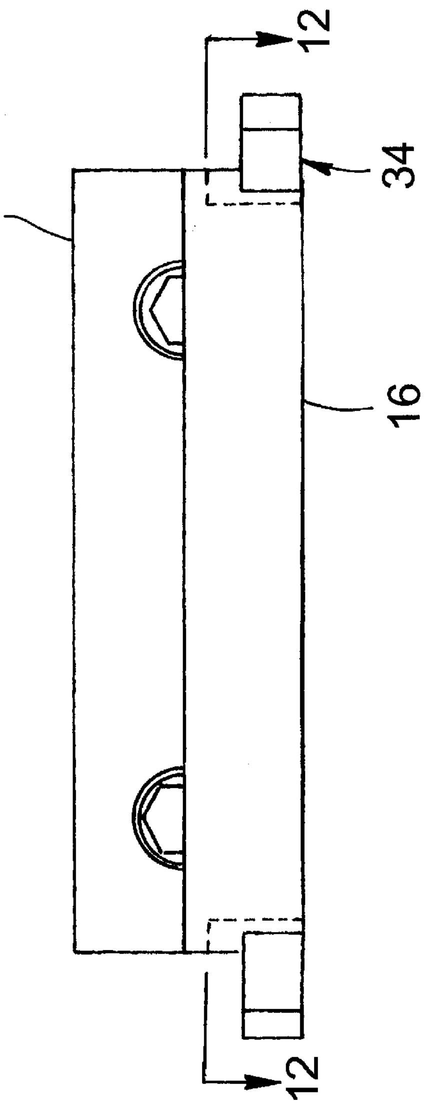
FIG. 11 is a front elevation view of the assembled clip system shown in FIG. 10.
Figure 14:
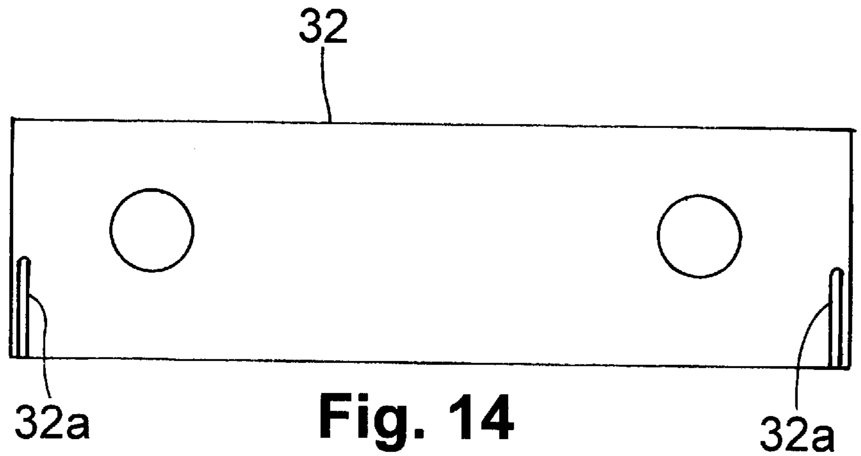
FIG. 14 is a back elevation view of the jaw member used in the modified clip system of FIG. 9.

Referring now to FIGS. 9–14, a modified version of the inventive clip system, generally designated as 30, is shown assembled together with a jaw 32 and vise head 36 on either side of standard machine vise to hold respective parallel 16 in place without use of retainer plate 20. In this modified clip system 30, jaw 32 is provided with a pair of notched slots 32*a,* best viewed in FIG. 14, each slot being formed on opposite sides of the rearward surface of the jaw and being positioned along the side edge of the jaw in a substantially vertical direction. Formed by conventional machining, the notched slots 32*a* may extend the entire height of the jaw 32 or a portion thereof on either side as shown in FIG. 14. Formed similarly to the slotted tab 20*a* extending from retainer plate 20 but instead made on the inside surface of jaw 32, each notched slot 32*a* is configured and positioned to engage a specially adapted clip member 34 on either side, particularly upon an intermediate hook section 34*b* formed on each clip member. As best viewed in FIG. 13, the clip members 34 are formed similarly to clip member 22, each having a cap section 34*a* at its forward end, a leg section 34*d* at its rearward end, and hook section 34*b* intermediately formed and inwardly disposed to engage the notched slot 32*a* on the back surface of the jaw 32 while the cap section 34*a* clamps the parallel 16 flush against the front of the jaw. To provide such engagement between the clip member 34 and jaw 32, best viewed in FIG. 12, the vise head 36 is machined on either side thereof at the forward surface immediately facing the back of jaw 32. Particularly as shown in FIG. 10, an opening 36*a* is made angularly through opposite corners on the forward side of vise head 36 to provide access to the notched slots 32*a* on either side and allow engagement therewith by the hook section 34*b* of clip member 34. Thus positioned along each side of vise head 36 and assembled in place as depicted in FIG. 9, the clip members 34 are urged into engagement with the notched slot 32*a* through the opening 36*a* on either side so that the hook section 34*b* of each clip member fits into and engages the notched slot 32*a* in a forwardly direction. The cap section 34*a* is thereby urged rearward against the edge of parallel 16, clamping the parallel flush against the front of jaw 32 and holding the parallel in place until the clip member 34 is released by outward deflection of its leg section 34*d.*

Figure 15:
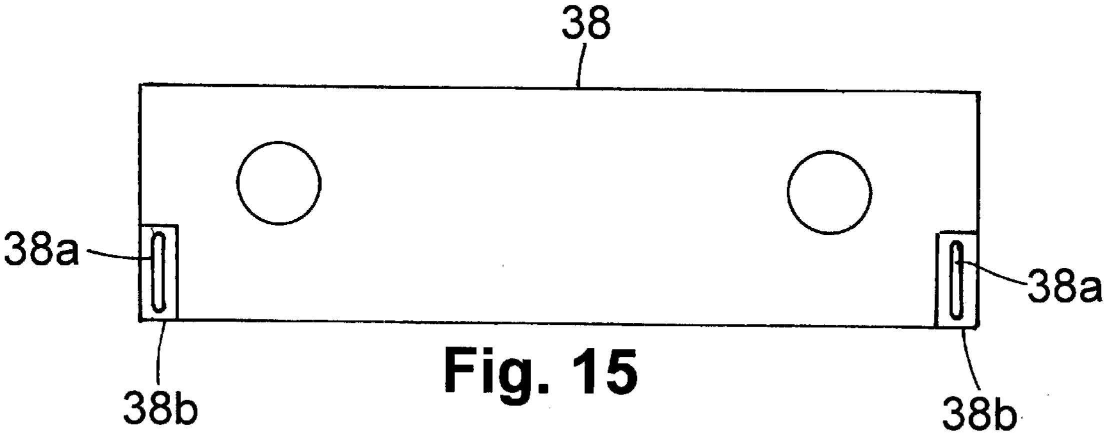
FIG. 15 is a back elevation view of an alternate configuration of jaw member that may be used in the present invention.
Figure 16:
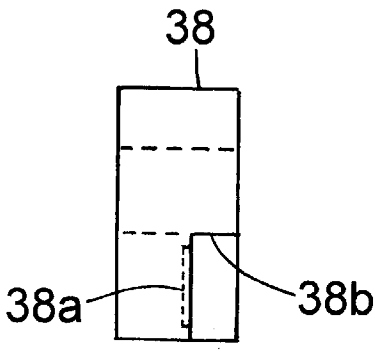
FIG. 16 is a side elevation view of the jaw member of FIG. 15.
Figure 17:
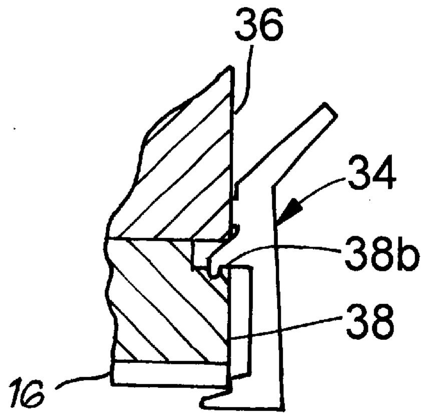
FIG. 17 is a partial plan view of the clip system employing the jaw member of FIG. 16 and partially sectioned to show engagement of the clip member.

Referring further to FIGS. 15–17, an alternate version of the modified clip system 30, also assembled without the use of retainer plate 20, is provided by the substitution of a modified jaw 38 for that of the jaw 32 employed in the foregoing embodiment. As best seen in FIGS. 15 and 16, a notched slot 38*a* is formed on either side of the back of jaw 38 along the side edge, like the slots 32*a* formed on the back surface of jaw 32, but disposed instead within a recessed cavity 38*b* cut into and formed along the lower edge on either side of the jaw. The depth and width of the recessed cavity 38*b* allows the entry and engagement of the notched slot 38*a* therein by the hook section 34*b* of each clip member 34, as shown in FIG. 17, without requiring the machinery of the vise head 36 to provide either of the forward openings 36*a* therein as described above in reference to the embodiment of FIGS. 9–14.

Therefore, it is apparent that the disclosed invention provides an improved clip system for holding parallels properly in place against the jaws of a vise, particularly more suitable and effective than those parallel holding devices heretofore developed. The disclosed invention provides an improved parallel holding system that is safer and easier to use on existing machine vises and that clamps the parallel in place against the jaw of the vise without interfering with the positioning of workpiece held within. In addition, the present clip system provides a parallel holder that is easily adapted to standard machine vises and that is effective in holding parallels of various sizes in proper position against the vise jaws. Furthermore, the present invention is easy to manipulate and relatively inexpensive to manufacture and implement on existing vises.

Obviously, other embodiments and modifications of the present invention will readily come to those of ordinary skill in the art having the benefit of the teachings presented in the foregoing description and drawings. It is therefore to be understood that various changes in the details, materials, steps and arrangement of parts, which have been described and illustrated to explain the nature of the invention, may be made by those skilled in the art within the principle and scope of the invention as expressed in the appended Claims.

What is claimed:

1. A system for holding a parallel in place within a vise, comprising:

a jaw member having a front and back surface adapted to be connected to the vise, said jaw member formed having a notched slot made on either side of the back surface thereof intended to face the vise when connected thereto; and a pair of clip members each integrally formed along the length thereof having an intermediate hook section adapted to engage the notched slot on either side of said jaw member and a forward cap section adapted to clamp parallel against the front surface of said jaw member when the hook section is engaged with the respective slot.

2. A parallel holding system according to claim 1, further comprising:

a vise head mounted on the vise and adapted to engage said jaw member along the back surface thereof, said vise head having an opening formed forwardly on either side of the surface of said vise head immediately proximate to said jaw member and adjacent to the notched slots thereon.

3. A parallel holding system according to claim 2, wherein each of said clip members further comprise a rearward leg section adapted to deflect the hook section from the notched slot thereby releasing the engagement thereof.

4. A parallel holding system according to claim 2, wherein the notched slot is provided on the rearward face of a recessed cavity formed on either side of said jaw member.

5. A system for holding a parallel in place within a vise, comprising:

a jaw member secured to the vise and formed having a pair of notched slots rearwardly facing on opposite sides of the back of said jaw member; and a pair of clip members each formed along the length thereof to engage a respective one of the notched slots in a forward direction on either side of said jaw member and to clamp the parallel in a rearward direction against the front of said jaw member.

6. A system for holding a vise parallel according to claim 5, wherein each of said clip members further comprise:

a hook section formed intermediate of the length of said clip member to engage a respective one of the notched slots on said jaw member; and a cap section formed at the forward end of said clip member to clamp the parallel flush against said jaw member when the hook section is engaged with the respective notched slot.

7. A system for holding a vise parallel according to claim 6, wherein each of said clip members further comprise:

a leg section formed at the rearward end of said clip member to deflect the hook section from engagement with the respective notched slot thereby releasing said clip member from said jaw member for removal of the parallel.

8. In a clamping system used to hold a vise parallel in place against the front of a jaw member connected to a vise head, the improvement comprising:

said jaw member having a pair of notched slots formed on opposite sides of the back surface thereof;

a pair of clip members each formed along the length thereof to engage a respective one of the notched slots in a forward direction while clamping the parallel in a rearward direction on opposite sides of said jaw member.

9. The improved vise parallel clamping system according to claim 8, further comprising:

said vise head formed having a pair of openings made through the forward surface thereof to align with respective ones of the notched slots on said jaw member.

10. The improved vise parallel clamping system according to claim 8, wherein each of the notched slots is provided on the rearward face of a recessed cavity formed on opposite sides of said jaw member.

11. The improved vise parallel system according to claim 8, wherein each of said pair of clip members further comprise:

a hook section formed intermediate of the length of said clip member and directed to engage a respective one of the notched slots;

a cap section formed at the front end of said clip member and directed to clamp the parallel against said jaw member when said hook section is engaged with the respective notched slot; and a leg section formed at the back end of said clip member and directed to deflect the hook section from engagement with the respective notched slot.

* * * * *